United States Patent [19]

Murakami et al.

[11] Patent Number: 5,006,874
[45] Date of Patent: Apr. 9, 1991

[54] APPARATUS FOR RECORDING IMAGES ON A ROLL OF FILM AND A FILM WINDING CARTRIDGE

[75] Inventors: Masanori Murakami; Akiyoshi Hamada; Mitsutoshi Yagoto, all of Toyokawa; Shinichi Mori, Gifu, all of Japan

[73] Assignee: Minolta Camera Kabushiki Kaisha, Osaka, Japan

[21] Appl. No.: 544,918

[22] Filed: Jun. 28, 1990

[30] Foreign Application Priority Data

Jun. 29, 1989 [JP] Japan .................................. 1-168492

[51] Int. Cl.⁵ .............................................. G03B 27/58
[52] U.S. Cl. ................................... 354/212; 346/108; 354/275; 355/72
[58] Field of Search ...................... 354/173.1, 212, 275; 355/72; 346/108

[56] References Cited

U.S. PATENT DOCUMENTS 4,811,058  3/1989  LaCourt ................................. 355/72
4,891,653  1/1990  Hamada et al. ....................... 346/108
4,949,121  8/1990  Ozawa .................................. 355/72

FOREIGN PATENT DOCUMENTS

59-83456   5/1984  Japan .
62-267937 11/1988  Japan .

Primary Examiner—Michael L. Gellner
Attorney, Agent, or Firm—Burns, Doane, Swecker & Mathis

[57] ABSTRACT

Image recording apparatus wherein a film is exposed to a laser beam so that an image is recorded on the film, the apparatus having a cartridge for winding the image-recorded film. The cartridge comprises a reel, a first and a second casing for housing the reel in such a manner as the reel can be dismounted, the casings capable of being integrated and disintegrated by moving in a direction perpendicular to the axis of the reel, a first guide unit disposed in the first casing for forcing the film wound around the reel toward the center of the reel elastically and a second guide unit disposed in the second casing for forcing the film wound around the reel toward the center of the reel.

11 Claims, 8 Drawing Sheets

APPARATUS FOR RECORDING IMAGES ON A ROLL OF FILM AND A FILM WINDING CARTRIDGE

BACKGROUND OF THE INVENTION

1. Field of the Invention

The present invention relates to apparatus for recording images on a roll of film and a cartridge for housing a film reel to be wound with the image-recorded film in such a manner as the film reel can be dismounted.

2. Description of Related Art

Recently, apparatus wherein a microfilm is exposed to a laser beam so that an image is recorded thereon has been proposed. Such image recording apparatus comprises an unexposed film reel for holding an unexposed film, a laser optical system, a film winding reel to be wound with the image-recorded film and a film transport mechanism for transporting the film from the unexposed film reel to the winding reel via an exposure section.

A cartridge in which both the unexposed film reel and the winding reel are integrally housed is known. Such a cartridge is useful when the film is to be developed after all the film was exposed for image recording, but is wasteful when the film is to be developed although a portion of the film remains unexposed.

The winding reel is to be disposed independently of the unexposed film reel so that only the image-recorded film wound around the winding reel is subjected to development. At that time, the reel wound with the image-recorded film needs to be housed in a cartridge in order not to be exposed to light, and also the winding reel needs to be dismounted from the cartridge easily to subject the image-recorded film to development.

Further, an operation of loading a film to such image recording apparatus has been practiced manually, which is troublesome. Specifically, before the film starts to be wound around the winding reel automatically, the operator has to insert the leading edge of the film in a crack formed on the core, and holding the leading edge of the film with the fingers so that the edge will not come out from the crack, the operator has to wind the film around the core a few times to fix the edge of the film on the winding reel.

In the light of the situation, Japanese Patent Laid-Open Publication No. 63-267937 discloses an automatic film winding device for which an exclusive film reel is used. The device comprises a mechanism for holding the leading edge of a film and a mechanism for winding the film around the reel. However, this device is to be provided with a special film reel having the holding mechanism, and an ordinary film reel on the market can not be used, thereby raising the cost.

SUMMARY OF THE INVENTION

It is therefore the main object of the present invention to provide image recording apparatus and a cartridge which a film winding reel to be wound with an image-recorded film is easily mounted on and dismounted from.

Another object of the present invention is to provide image recording apparatus and a cartridge which is effectively shielded from light and from which the reel is dismounted in such a manner as the film wound around the reel never becomes loose.

Further, another object of the present invention is to provide a cartridge to which an ordinary film on the market is loaded automatically.

To attain the above-described objects, image recording apparatus according to the present invention comprises means for feeding a film to an image recording section; means for recording an image on the film fed by the film feeding means; and means for winding the film on which an image was recorded. The film winding means comprises a reel to be wound with the film; a first and a second casing for housing the reel in such a manner as the reel can be dismounted, the casings capable of being integrated and disintegrated by moving in a direction perpendicular to the axis of the reel; first guide means disposed in the first casing for forcing the film wound around the reel toward the center of the reel elastically; and second guide means disposed in the second casing for forcing the film wound around the reel toward the center of the reel elastically.

Further, in the image recording apparatus according to the present invention, the first casing has a drive shaft member engaging with the core of the reel, the first guide means is capable of retracting outwardly from the flanges of the reel, and the second guide means is capable of retracting outwardly from the flanges of the reel when the first and the second casings are disintegrated.

When mounting a film reel in the cartridge, first in a state that the first guide means disposed in the first casing is in the retracting position, a film winding reel which is empty is set on the drive shaft member, and the first guide means is returned to the set position. Next, the second casing is put over the first casing so that the casings are integrated. Thus, the film reel is housed in the dark, and inside the cartridge, the core of the film reel is surrounded by the first and the second guide means. This cartridge is to be set in a specified position of the image recording apparatus, and when it is set, the drive shaft member is connected to the drive system of the recording apparatus.

The leading edge of the film entering the cartridge is fed between the core of the reel and the second guide means and guided by the second guide means to wind around the core. Further, the film is guided by the first guide means, and when the film make a round on the core, the leading edge comes between the succeeding portion of the film and the core. Since the first and the second guide means are forced toward the core elastically, as the quantity of the film wound around the core is increasing, both the guide means are receding from the core, while guiding the film winding around the reel and regulating the wound film not to spread outwardly. Thus, the present invention enables a film reel on the market to be used for the apparatus and the reel to be loaded to the apparatus automatically.

When desired image recording is completed and the image-recorded film has been wound up, the cartridge is dismounted from the image recording apparatus, and the casings are disintegrated to take out the reel. When disintegrating the casings, the second casing is separated from the first casing, and simultaneously the second guide means gets away from the reel. The first guide means, however, keeps in contact with the film wound around the reel remaining in the first casing, so that the first guide means continues regulating the film not to spread outwardly. Accordingly, the operator only has to control the first guide means to retract outwardly from the flanges of the reel and dismount the reel from the first casing pressing the film. Thus, according to the present invention, the reel wound with the image-recorded film can be dismounted from the cartridge in an extremely simple manner. Also, it does not take so much time to set the film in a developing device after the open of the cartridge because of the speedy film take-out operation, which decreases troubles such as exposure.

Further, when the first guide means is provided with a retracting handle so that the operator can operate the first guide means to retract outwardly from the outside of the cartridge, the mount and dismount of the reel becomes easier.

BRIEF DESCRIPTION OF THE DRAWINGS

These and other objects and features of the present invention will become apparent from the following description taken in conjunction with the preferred embodiment thereof with reference to the accompanying drawings, in which.

DESCRIPTION OF THE PREFERRED EMBODIMENT

An embodiment according to the present invention is hereinafter described referring to the accompanying drawings.

Figure 1:
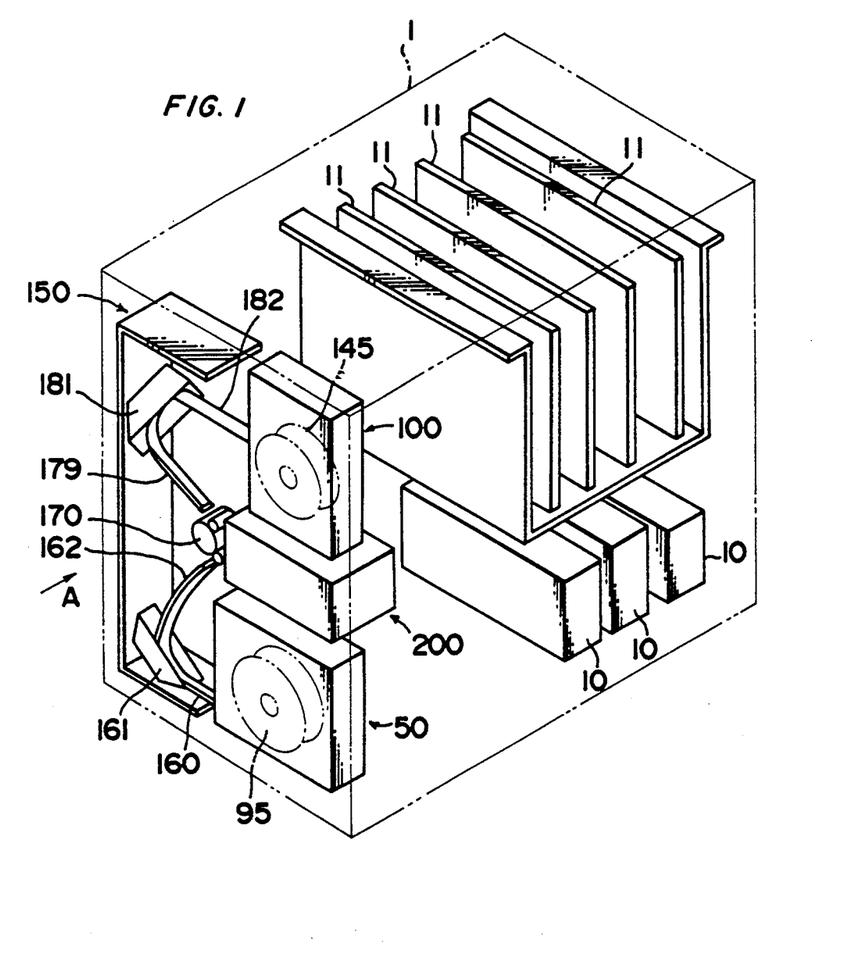
FIG. 1 is a perspective view showing the essential construction of laser image recording apparatus.
Figure 2:
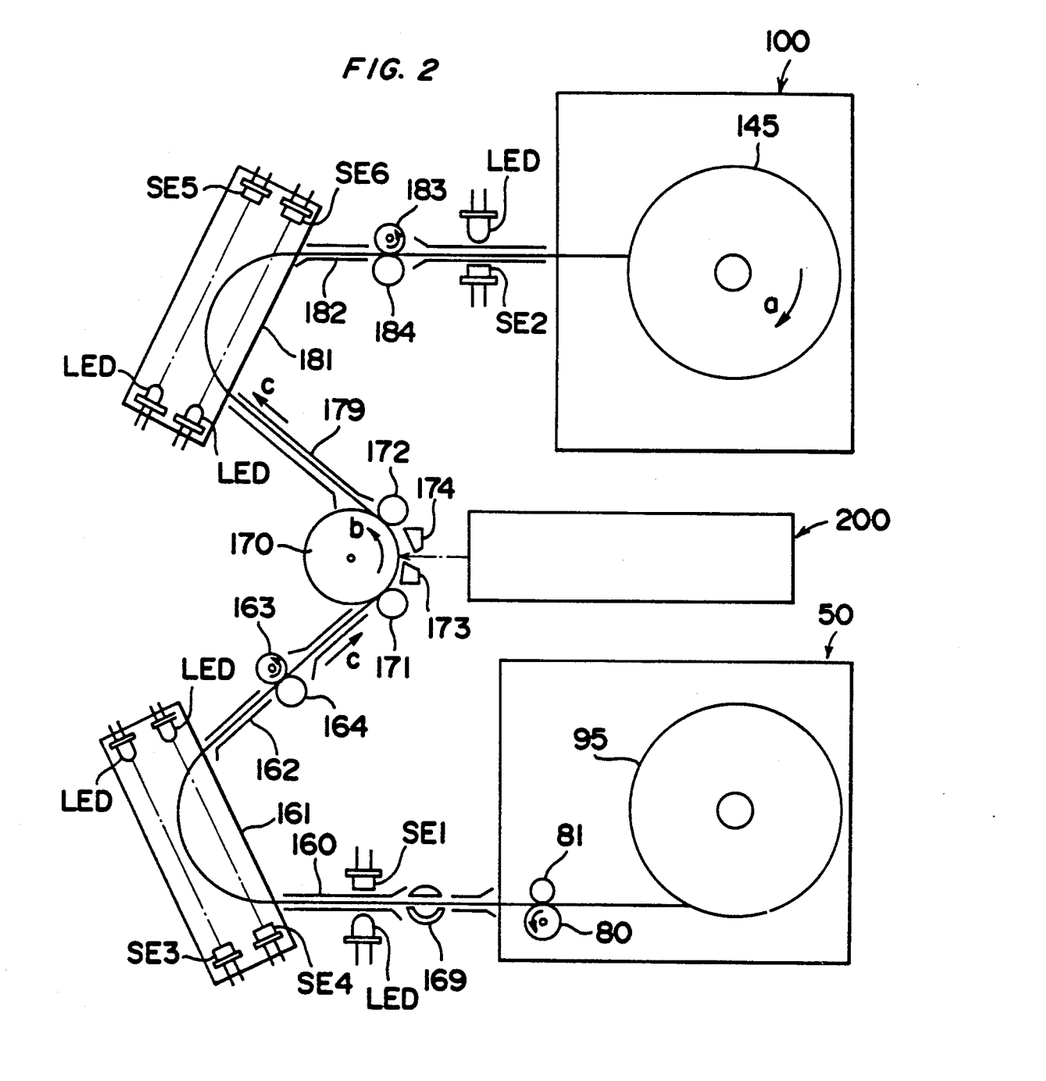
FIG. 2 is a front view of a film transport path.

First, laser image recording apparatus is described with reference to FIGS. 1 and 2.

The apparatus is of desktop type, and all the components are housed within a unit frame 1; the arrow (A) indicates the front side of the apparatus. An unexposed film cartridge 50 and a winding cartridge 100 are installable in holders (not shown) which are slidably mounted on the right front side of the unit frame 1. A film reel 95 on which an unexposed film is wound is rotatably housed within the cartridge 50, and the unexposed film is fed out between a drive roller 80 and a pinch roller 81 which is rotatably in contact with said drive roller 80.

A film reel 145 is housed within the cartridge 100 in a manner described hereinafter, and as the film reel 145 is rotating in the direction of the arrow (a) in FIG. 2, the film on which image information was recorded is being wound on the film reel 145.

The film transport path is formed of a film pass unit 150 disposed in the unit frame 1 at the front left side. The unit 150 comprises, in order in the film transport direction indicated by the arrow (c), a guide member 160 for guiding the unexposed film fed from the unexposed film cartridge 50, a slack detecting device 161, a guide member 162, a main roller 170, a guide member 179, a slack detecting device 181 and a guide member 182. The guide member 162 has two rollers in the middle: a one-way clutch roller 163 which is rotatable only in the film transport direction and a pinch roller 164 which is rotatably in contact with the one-way clutch roller 163. The guide member 182 has a drive roller 183 and a pinch roller 184 likewise. A film cutter 169, and an LED (light emitting diode) and a photosensor SE1 for detecting a film are provided for the guide member 160, and an LED and a photosensor SE2 for detecting a film are provided for the guide member 182.

The slack detecting devices 161 and 181 assure optimum running of a film for stable image recording. Each of the devices 161 and 181 has to couples of an LED and a photosensor SE3 and SE4 or SE5 and SE6 to detect the film slacking. The main roller 170 is driven to rotate in the direction of the arrow (b), and two pinch rollers 171 and 172 are so disposed on the circumference of the main roller 170 that the rollers 171 and 172 are freely rotatable. Also, film guides 173 and 174 are disposed in the periphery of the main roller 170.

A semiconductor laser, a beam scanning polygon mirror, an fθ lens, etc. are integrated into an optical unit 200. The surface of the microfilm held on the circumference of the main roller 170 is exposed to a modulated laser beam, whereby an image is recorded on the microfilm. A silver salt film of 16-millimeter wet type is used in the apparatus; a normal A4-sized image is reduced by 1/24 and recorded at a density of 9,600 DPI (dots per inch).

A brief description of the film transport process is given hereinafter.

The film is automatically loaded. First, the film fed from the feed rollers 80 and 81 is transported through the guide member 160 toward the slack detecting device 161, and passes the rollers 163 and 164 toward the main roller 170. The film is firmly pressed against the main roller 170 by the pinch rollers 171 and 172, and then is transported through the guide member 179 toward the slack detecting device 181 by means of the rotation of the main roller 170. Finally, a transporting force is applied to the film by the slack controlling rollers 183 and 184, and the film is wound around the film reel 145 in the winding cartridge 100.

Image recording with the optical unit 200 is accomplished as the laser beam scans on the film by means of the polygon mirror in a direction crossing the film transport direction (c), that is, in a direction parallel to the axis of the main roller 170 (main scanning) and as the film is transported by means of the rotation of the main roller 170 (sub scanning). At that time, the main roller 170 is driven to rotate at a constant speed. When the film is detected by the photosensor SE3 in the slack detecting device 161, the feed roller 80 is stopped rotating, and when the film is no longer detected by the photosensor SE4, the feed roller 80 is driven again. Also, when the film is detected by the photosensor SE5 in the slack detecting device 181, the roller 183 and the film reel 145 are driven to rotate, and when the film is no longer detected by the photosensor SE6, they are stopped rotating. Such slack control is executed also while the film is loaded automatically.

When desired image recording is completed, the cutter 169 is actuated to cut the film, and the cut film is wound around the film reel 145.

Further, power units 10 and various control boards 11 for controlling and driving the optical unit 200, the film pass unit 150, etc. are disposed in the unit frame 1 at the rear side.

The construction and the operation of the film winding cartridge 100 are hereinafter described with reference to FIGS. 3 to 8.

Figure 3:
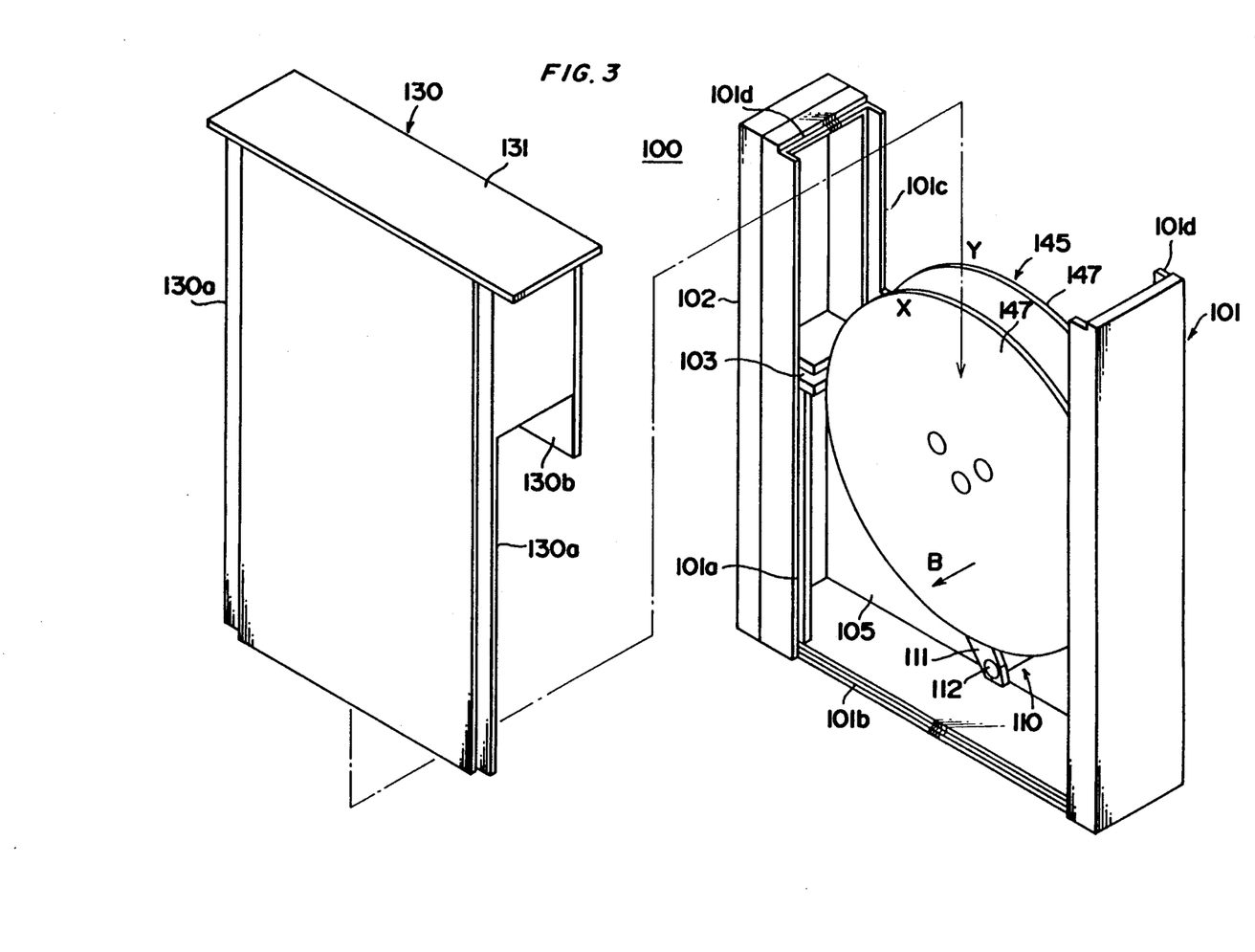
FIG. 3 is an exploded perspective view of a film winding cartridge.
Figure 4:
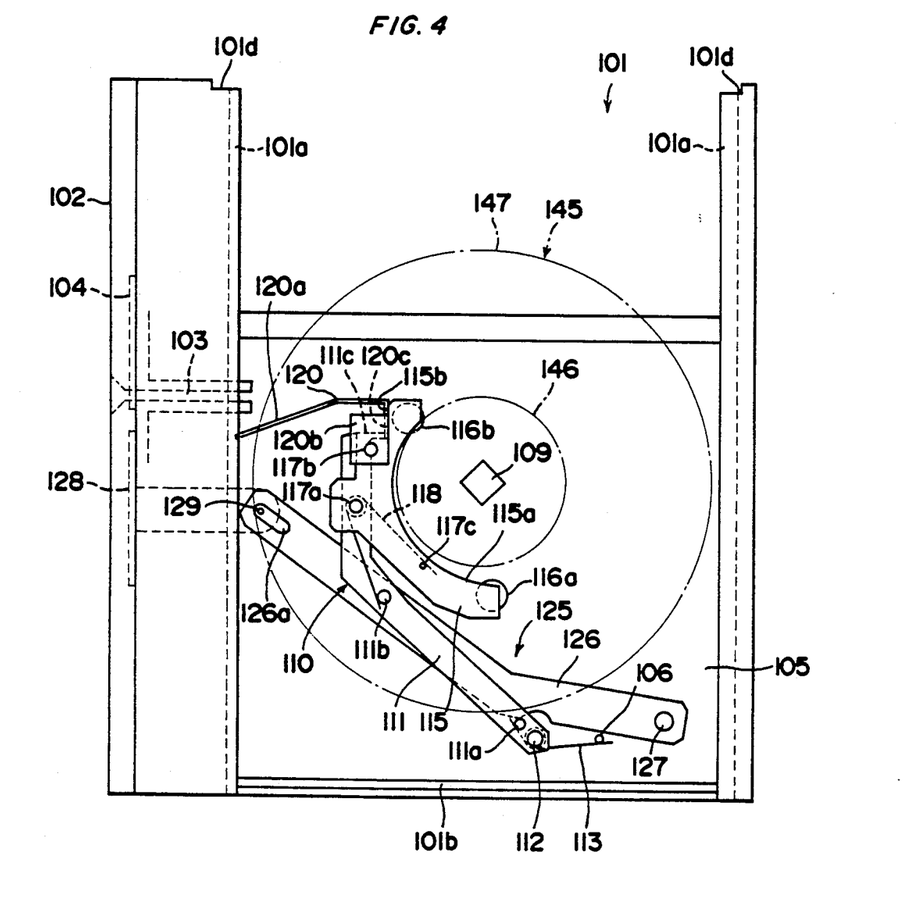
FIG. 4 is a front view of a lower casing of the cartridge.
Figure 7:
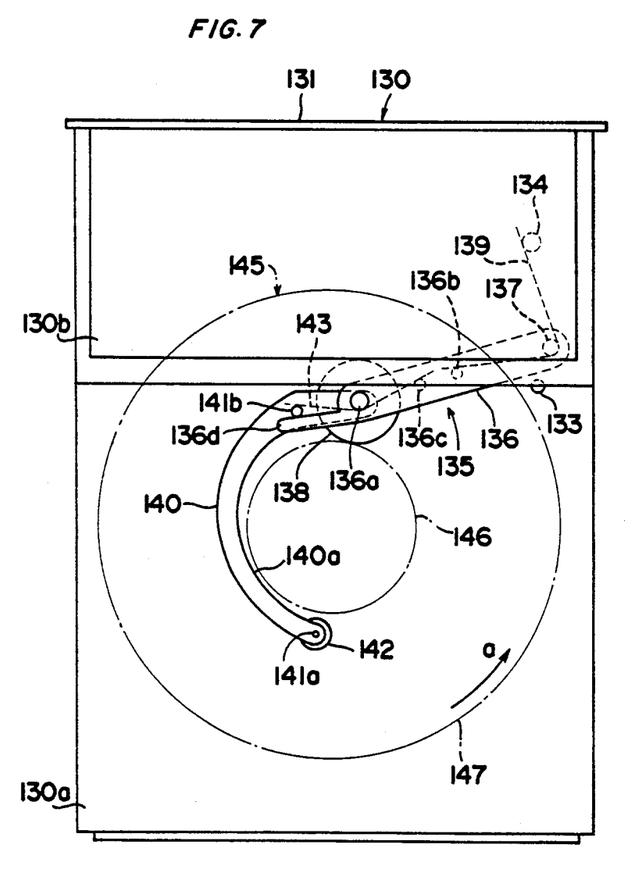
FIG. 7 is a rear view of an upper casing of the cartridge.

The cartridge 100 is divided into two sections, a lower casing 101 and an upper casing 130, as shown in FIG. 3. Referring to FIG. 4, in the lower casing 101, provided are a drive shaft 109 for holding and rotating the winding film reel 145, a slit 103 for introducing the image-recorded film and first film guide means 110. Second film guide means 135 is provided for the upper casing 130 as shown in FIG. 7. The side panel 130a of the upper casing 130 slides along grooves 101a of the lower casing 101 to integrate the casings 130 and 101, and thereby the film reel 145 is held in the dark within the housing The side panel 130a, the rear panel 130b and the edge portion of the lid 131 of the upper casing 130 are properly fitted in the grooves 101a, the step 101b, the rear panel 101c and the upper steps 101d of the lower casing 101 so that the interior of the cartridge 100 is completely shielded from light.

Figure 6:
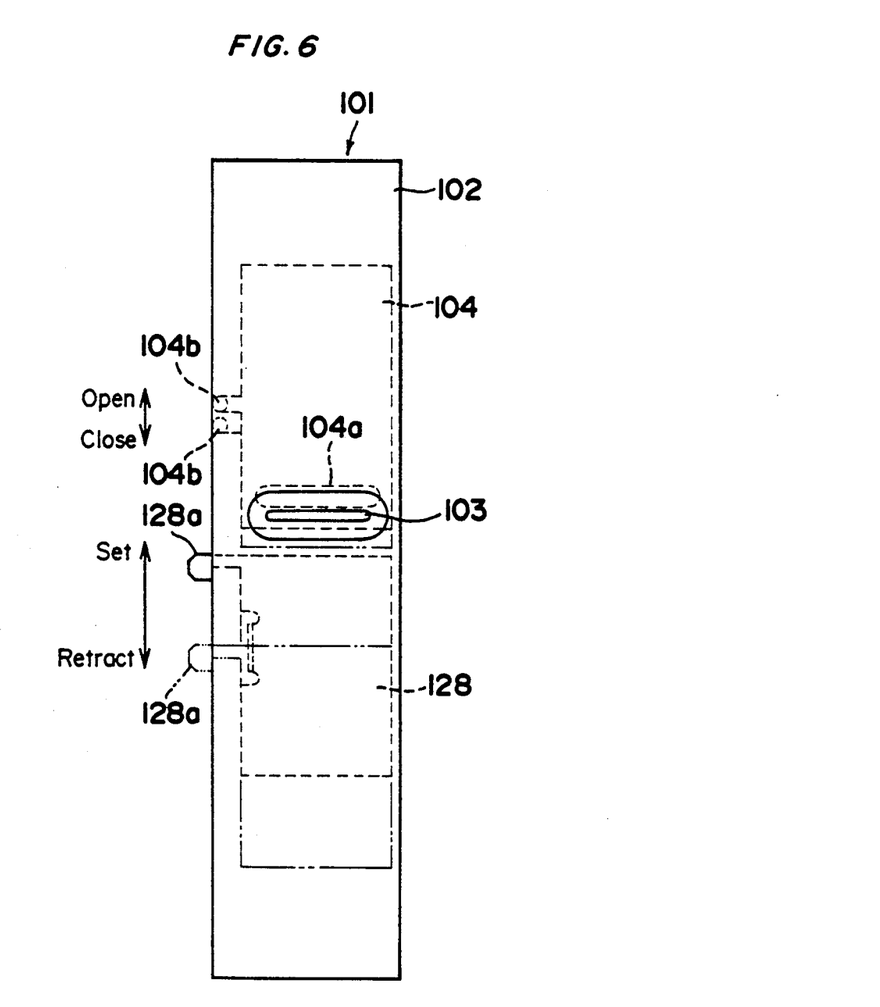
FIG. 6 is a left side view of the lower casing in FIG. 4.

A vertically slidable shutter 104 having an opening 104a, as shown in FIG. 6, is disposed over the slit 103 formed on the side frame 102 of the lower casing 101. The shutter 104 closes the slit 103 to shield the interior from light when the cartridge 100 is outside of the recording apparatus. At the beginning of a film autoloading operation, the shutter 104 slightly slides downward so that the opening 104a is aligned with the slit 103. The aforesaid operation is controlled by switching on and off a solenoid (not shown) connected to the protrusion 104b of the shutter 104 when this cartridge 100 is loaded in the recording apparatus. Further, the film introducing portion into the slit 103 is tapering. This tapered configuration improves accuracy in introducing the leading edge of the film to the slit 103. For the microfilm has a pliability and tendency to coil. On the other hand, the slit 103 is desirably very narrow for light shielding. The tapering film introducing portion into the slit 103 enables the leading edge of the film to be securely guided to the slit 103 when the film is loaded automatically It also improves the light shielding characteristic, and the load on the solenoid is reduced because of the short opening/closing stroke of the shutter 104. Further, only the sides of the tapering portion confronting the front and back surfaces of the film may be sloped.

The drive shaft 109 is rotatably fitted to the rear frame 105 of the lower casing 101, and is shaped to the center hole of the core 146 of the film reel 145. The drive shaft 109 is connected to a drive mechanism in the recording apparatus by means of a coupler (not shown) when this cartridge 100 is loaded in the recording apparatus, and the drive mechanism provides a rotational force for the film reel 145 at specified timing.

Figure 5:
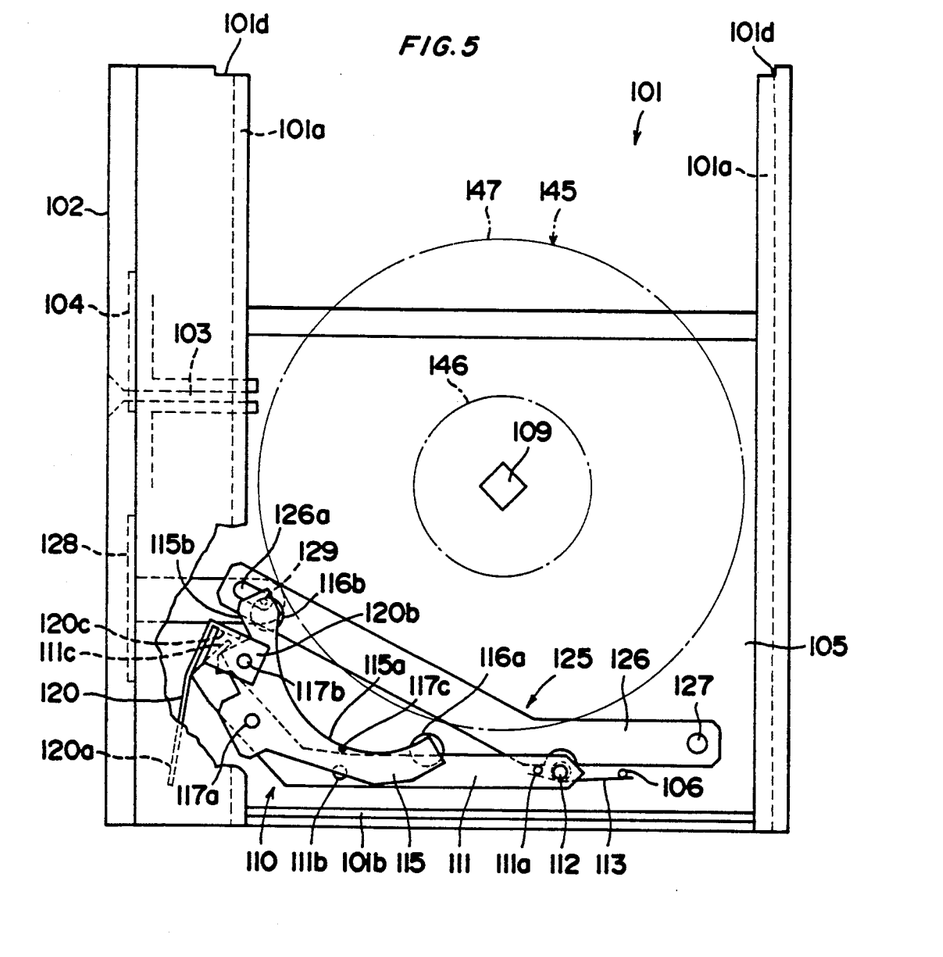
FIG. 5 is a front view of the lower casing showing a first film guide means in the retracted state.

Referring to FIGS. 4 and 5, the first film guide means 110 comprises an arm 111, a guide plate 115 having an arched guide portion 115a and a film support 120. The arm 111 is pivoted on a support shaft 112 fixed on the rear frame 105 and is urged clockwise by a coil spring 113 coiled on the support shaft 112. One end of the coil spring 113 is pressed against a pin 106 fixed on the rear frame 105, and the other end is pressed against a pin 111a disposed on the arm 111. The guide plate 115 has rotatable guide rollers 116a and 116b on either side; two identically shaped plate members are supported by pins 117a and 117b and a guide roller support pin (not shown) so that the two plate members are paralleled at a specified distance. The guide plate 115 is fitted on the arm 111 via the pin 117a in such a manner as the guide plate 115 is capable of pivoting on the pin 117a, and is urged clockwise by a coil spring 118 coiled on the pin 117a. One end of the coil spring 118 is pressed against a pin 111b disposed on the arm 111, and the other end is pressed against a pin 117c disposed on the guide plate 115. The film support 120 comprises a lever 120a, a side piece 120b and a plate 120c, and the side piece 120b is supported on the pin 117b so that the film support 120 pivots thereon.

Retracting means 125 comprises an arm 126 and a slider 128. The arm 126 is pivoted on a support shaft 127 fixed on the rear frame 105, and the pin 111a of the arm 111 touches the arm 126 from below. The slider 128 is fitted on the side frame 102 of the lower casing 101 so as to be vertically movable, and a protrusion 128a (see FIG. 6) formed on the side of the slider 128 protrudes from the rear side of the lower casing 101. The arm 126 and the slider 128 are connected with each other by the engagement of a pin 129 attached to the slider 128 with a long hole 126a formed at the edge portion of the arm 126. When the operator moves up or down the protrusion 128a, the slider 128 moves accordingly, and the arm 126 pivots on the support shaft 127.

In the above-described construction, while the film is being guided, as shown in FIG. 4, the slider 128 and the retracting arm 126 are pulled upward, the arm 111 turns clockwise around the support shaft 112 due to the repulsive force of the coil spring 113, and the guide plate 115 is forced to pivot clockwise on the pin 117a due to the repulsive force of the coil spring 113. At the beginning of a film winding operation, the pin 111a of the arm 111 is in contact with the retracting arm 126, and the arm 111, the guide plate 115 and the film support 120 intrude between the flanges 147 of the film reel 145. The guide roller 116b is in contact with the circumference of the core 146 of the film reel 145, and the guide rollers 116a and 116b and the guide portion 115a guides the film so as to wind around the core 146. In addition, regarding the film support 120, the plate 120c is gripped by the leading edge projection 111c of the arm 111 and the rear portion 115b of the guide plate 115, so that the lever 120a of the film support 120 guides and supports the leading edge of the film guided from the aforesaid slit 103 toward the core 146.

When the slider 28 travels downward, on the other hand, the retracting arm 126 pivots on the support shaft 127 so as to turn counterclockwise, and the arm 111 turns counterclockwise clockwise around the support shaft 112 because the retracting arm 126 exerts pressure on the arm 111 through the pin 111a. Thus, as shown in FIG. 5, the arm 111, the guide plate 115 and the film support 120 retract outwardly from the flanges 147 of the film reel 146. The film reel 145 is thereby removable. The retracting arm 126 is disposed in proximity to the rear frame 105 so as to avoid obstructing the installation and removal of the film reel 145.

Figure 8:
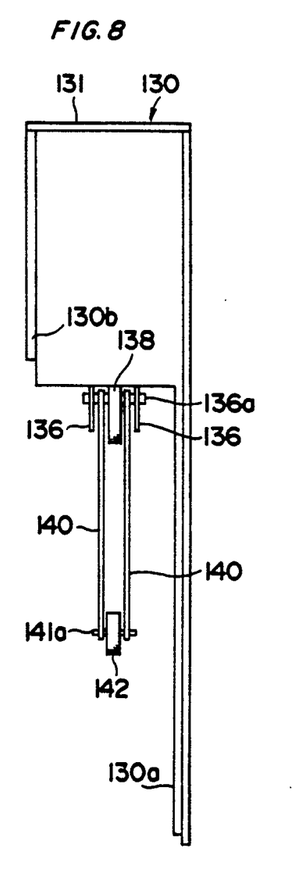
FIG. 8 is a right side view of the upper casing in FIG. 7.

The second film guide means 135 makes a pair with the aforesaid first film guide means 110, and it guides the film winding around the film reel 145 from above. The second film guide means 135 comprises an arm 136 and a guide plate 140 having an arched guide portion 140a as shown in FIGS. 7 and 8. The arm 136 and the guide plate 140 each comprises two identically shaped guide members which are supported by pins 136a, 136b, 136c and 141a so that the identical members are paralleled at a specified distance. Both the arm 136 and the guide plate 140 are connected by a connector pin 136a on which a large-diameter guide roller 138 is fitted. A small-diameter guide roller 142 is fitted on the pin 141a at the edge of the guide plate 140.

The arm 136 is pivoted on a support shaft 137 disposed in the upper casing 130, and a force in the counterclockwise direction is applied to the arm 136 by a coil spring coiled on the shaft 137. The spring force is regulated by a stopper pin 133 attached to the upper casing 130. One end of the coil spring 139 is pressed against a pin 134 disposed in the upper casing 130, and the other end of the spring 139 is pressed against the pin 136b on the arm 136. The guide plate 140 is capable of pivoting on the support shaft 136a, and is forced counterclockwise by a coil spring 143 coiled on the support shaft 136a. The spring force is regulated by a pin 141b on the guide plate 140 which comes into contact with a protrusion 136d of the arm 136. One end of the coil spring 143 is pressed against the pin 136c on the arm 136, and the other end of the spring 143 is pressed against the pin 141b on the guide plate 140.

The operation of the film guide means 110 and 130 in installing and removing the film reel 145 is hereinafter described.

When the film reel 145 is installed in the cartridge 100, the operator has to push down the protrusion 128a of the slider 128 to move the film guide means 110 downward to be in the retracted state. In this state, as shown in FIG. 5, the center hole of the core 146 of the film reel 145 which is empty comes into engagement with the drive shaft 109. Thereafter, the operator moves up the slider 128 to return the film guide means 110 to the position as shown in FIG. 4. Next, the upper casing 130 and the lower casing 101 are integrated. At that time, the guide roller 142 comes into contact from above with the core 146 of the film reel 145 installed in the lower casing 101, the guide plate 140 and the arm 136 pivots upward on the pin 136a and the support shaft 137 respectively, and the guide plate 140 half surrounds the core 146 so that the guide roller 142 and the edge of the guide plate 140 is placed below the core 146.

In the aforesaid state, the interior of the cartridge 100 is shielded from light. The guide rollers 116b and 138 come into contact with the circumferential surface of the core 146, the guide rollers 116a and 142 confront each other maintaining a slight gap therebetweeen, and the guide plates 115 and 140 surround the core 146.

Then, when the cartridge 100 is loaded in the top holder (not shown) of the recording apparatus, the drive shaft 109 is connected to the drive mechanism of the recording apparatus, and the protrusion 104b of the shutter 104 is connected to the plunger of the solenoid (not shown).

When a film autoloading operation starts, the shutter 104 is operated to open the slit 103, and the leading edge of the film passing through the aforesaid film pass unit 150 is introduced into the cartridge 100 through the slit 103. At that time, the film reel 145 is driven to rotate in the direction of the arrow (a). The leading edge of the film which has passed slit 103 is first guided by the lever 120a of the film support 120 to be introduced between the guide roller 138 and the core 146, and then is provided with a propulsive force by the core 146 due to the rotation of the film reel 145. The leading edge of the film provided with the propulsive force reaches the guide plate 140 and is guided by the guide portion 140a in the direction of the arrow (a) so as to wind around the core 146. The leading edge of the film passes the guide rollers 142 and 116a, and is guided by the guide portion 115a of the guide plate 115 to come between the guide roller 116b and the core 146. When the film makes a round, the leading edge comes between the core 146 and the succeeding portion of the film which is pressed against the core 146 by the guide roller 138, and the film continues winding thereon. When the circumferential speed of the core 146 is slightly greater than the film transport speed, the film can be fixedly wound on the core 146 because of the frictional force between the film and the core 146.

Since the guide plates 115 and 140 are both urged toward the core 146 elastically and flexibly, as the quantity of the film wound around the core 146 is increasing, the guide rollers 116b and 138 recede from the core 146, while they keep contact with the film and keep on rotating. Further, when the quantity of the film wound around the core 146 reaches a specified amount, the other guide rollers 116a and 142 come into contact with the film and start to rotate. Thereafter, as the quantity of the wound film increases, the film guide means 110 recedes from the core 146 and approaches the side frame 102. Specifically, the arm 111 pivots counterclockwise on the support shaft 112 gradually, and the guide plate 115 moves downward following the arm 111 almost keeping the posture shown in FIG. 4. Thereby, the plate 120c of the film support 120 is no longer stuck between the rear portion 115b of the guide plate 115 and the protrusion 111c of the arm 111. Then, the film support 120 pivots counterclockwise on the pin 117b because of the gravity and starts folding. The film support 120 thus folds up when it moves outwardly, and the lever 120a rises to a horizontal state when it approaches the core 146. Hence, the cartridge 100 is compact and economical because no special drive means is required simply to fold up the film support 120. Furthermore, the film is not damaged during a winding operation because the film is in contact with only the rollers while winding.

When specified images have been recorded on the automatically loaded film, the cutter 160 operates to cut the film, and the film is wound on the film reel 145. Thereafter, the cartridge 100 is dismounted from the recording apparatus, and the upper casing 130 is pulled upward to be separated from the lower casing 101. In this moment, the second film guide means 135 disposed in the upper casing 130 separates from the film reel 145 without hindrance because the film guide means 135 is above the wound film. Also, the guide plate 115 and the rollers 116a and 116b of the first film guide means 110 disposed in the lower casing 101 regulate the film not to spread outwardly. When the film reel 145 is discharged from the lower casing 101, the operator should pinch the film reel 145 at the spots indicated by (X) and (Y) in FIG. 3, and also insert the fingers between the flanges 147 to press the film. In the state, the operator has to move down the slide 128 to move the retracting arm 126 downward, and thereby the first film guide means 110 is retracted away from the flanges 147. Then, the operator has to pull the film reel 145 in the direction of the arrow (B) shown in FIG. 3 so as to disengage the center hole of the core 146 from the drive shaft 109.

With the above-described arrangement for the cartridge 100, even when the upper casing 130 is separated from the lower casing 101, the film does not become loose, and the film reel 145 can be discharged from the cartridge 100 in an extremely simple manner. In addition, since the film reel 145 does not require any special mechanisms, a conventional reel on the market may be used without any modifications; the film can also be loaded automatically.

To force the arm 111 in the counterclockwise direction may enable the first guide means 110 to be retracted. However, if the retracting means 125 as described in this embodiment is provided, retraction and return of the first guide means 110 can be operated from outside of the cartridge 100, which makes the cartridge 100 more convenient. Further, when a spring member is attached to the retracting arm 126 or the slider 128 to render said arm or slider capable of automatically returning to a set position (see FIG. 4), the cartridge 100 becomes easier to handle.

Figure 9:
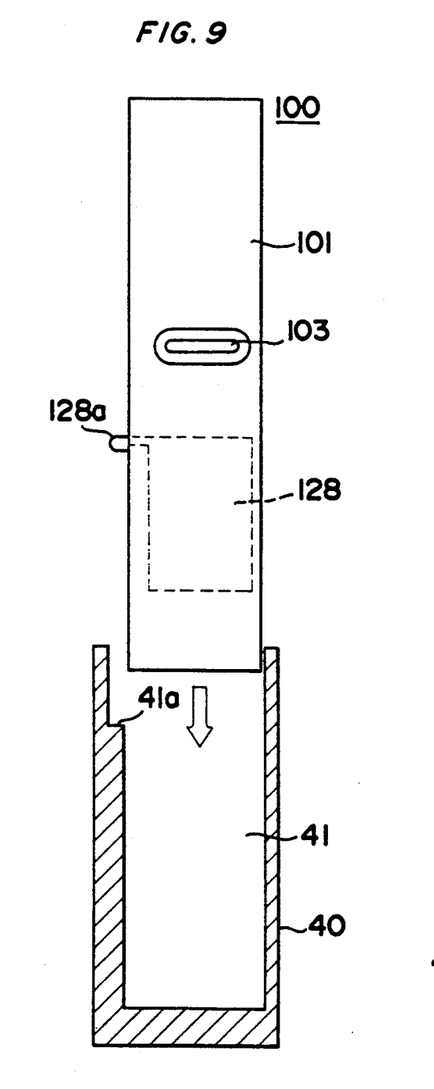
FIGS. 9 and 10 are partial section views explaining installation of the cartridge in a holder.
Figure 10:
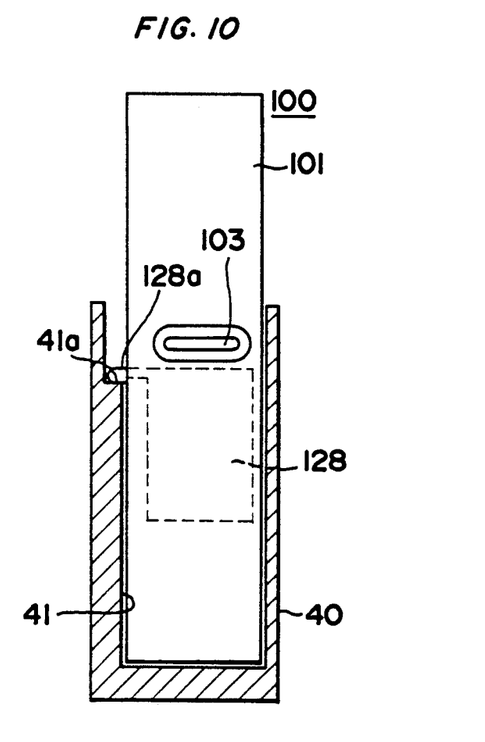

FIGS. 9 and 10 show the relationship between the winding cartridge 100 and the holder 40 attached to the recording apparatus. A step 41a is formed on the interior wall of the holding compartment 41 of the holder 40, and when the cartridge 100 is loaded in the recording device, the protrusion 128a of the slider 128 comes into contact with the step 41a so that the retracting means 125 and the first film guide means 110 automatically return to the set position shown in FIG. 4. It eliminates errors in the first film guide means 110 which may occur during film reel loading.

Although the present invention has been described in connection with the embodiment above, it is to be noted that various changes and modification are apparent to those who are skilled in the art. Such changes and modifications are to be understood as included within the scope of the present invention as defined by the appended claims, unless being separated therefrom.

For example, the film winding cartridge 100 is not limited to a configuration whereby opening and closing is accomplished by sliding the upper casing 130 relative to the lower casing 101, but may also have a configuration whereby the upper casing 130 is pivoted on a support shaft fitted on one corner of the lower casing 101 so that the lower casing 101 is opened and closed by pivoting the upper casing 130.

What is claimed is:

1. Apparatus for recording images on a roll of film, comprising:
   means for feeding a film to an image recording section;
   means for recording an image on the film fed by the film feeding means; and
   means for winding the film on which an image was recorded, said film winding means comprising:
   a reel to be wound with the film;
   a first and a second casing for housing the reel in such a manner as the reel can be dismounted, said casings capable of being integrated and disintegrated by moving in a direction perpendicular to the axis of the reel;
   first guide means disposed in the first casing for forcing the film wound around the reel toward the center of the reel elastically; and
   second guide means disposed in the second casing for forcing the film wound around the reel toward the center of the reel elastically.

2. Apparatus as claimed in claim 1, wherein the first casing has a drive shaft member engaging with the core of the reel.

3. Apparatus as claimed in claim 1, wherein the first guide means is capable of retracting outwardly from the flanges of the reel.

4. Apparatus as claimed in claim 3, wherein said first casing has a handle for controlling the first guide means to retract outwardly against the elastic force, said handle protruding from the first casing.

5. Apparatus as claimed in claim 1, wherein the second guide means is capable of retracting outwardly from the flanges of the reel when the first and the second casings are disintegrated.

6. Apparatus as claimed in claim 1, further comprising means for cutting the film, said cutting means disposed between the film feeding means and the image recording section.

7. A cartridge for housing a reel to be wound with a film in such a manner as the reel can be dismounted, said cartridge comprising:
   a first and a second casing for housing the reel in such a manner as the reel can be dismounted, said casings capable of being integrated and disintegrated by moving in a direction perpendicular to the axis of the reel;
   first guide means disposed in the first casing for forcing the film wound around the reel toward the center of the reel elastically; and
   second guide means disposed in the second casing for forcing the film wound around the reel toward the center of the reel elastically.

8. A cartridge as claimed in claim 7, wherein the first casing has a drive shaft member engaging with the core of the reel.

9. A cartridge as claimed in claim 7, wherein the first guide means is capable of retracting outwardly from the flanges of the reel.

10. A cartridge as claimed in claim 9, wherein said first casing has a handle for controlling the first guide means to retract outwardly against the elastic force, said handle protruding from the first casing.

11. A cartridge as claimed in claim 7, wherein the second guide means is capable of retracting outwardly from the flanges of the reel when the first and the second casings are disintegrated.

* * * * *